(12) United States Patent
Faccio et al.

(10) Patent No.: US 7,356,219 B2
(45) Date of Patent: Apr. 8, 2008

(54) INTEGRATED OPTICAL ADD/DROP DEVICE HAVING SWITCHING FUNCTION

(75) Inventors: Daniele Faccio, Milan (IT); Giacomo Gorni, Milan (IT); Marco Romagnoli, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/541,071

(22) PCT Filed: Dec. 31, 2002

(86) PCT No.: PCT/EP02/14812

§ 371 (c)(1),
(2), (4) Date: Apr. 5, 2006

(87) PCT Pub. No.: WO2004/059353

PCT Pub. Date: Jul. 15, 2004

(65) Prior Publication Data

US 2006/0233486 A1    Oct. 19, 2006

(51) Int. Cl.
G02B 6/26 (2006.01)
(52) U.S. Cl. .......................................... 385/27; 385/14
(58) Field of Classification Search .................. 385/14, 385/27
See application file for complete search history.

(56) References Cited

U.S. PATENT DOCUMENTS

| | | | |
|---|---|---|---|
| 5,812,709 A | 9/1998 | Arai et al. | |
| 6,052,495 A | 4/2000 | Little et al. | |
| 6,285,810 B1 | 9/2001 | Fincato et al. | |
| 6,504,971 B1 * | 1/2003 | Margalit et al. | ............... 385/24 |

(Continued)

FOREIGN PATENT DOCUMENTS

EP    0 903 616 B1    3/1999

(Continued)

OTHER PUBLICATIONS

T. Augustsson; "Cross-coupled MZI Configuration for Wavelength Selective Switching", Electronics Letters, vol. 35, No. 12, pp. 990-992, (1999).

(Continued)

*Primary Examiner*—Ellen E. Kim
(74) *Attorney, Agent, or Firm*—Finnegan, Henderson, Farabow, Garrett & Dunner, L.L.P.

(57) ABSTRACT

An integrated optical add/drop device having switching function for use in wavelength division multiplexing optical communication systems, has first and second optical couplers between which first and second interferometric arms of an interferometer are extended. The integrated optical add/drop device has an optical filter having first and second input ports connected to first portions of the first and second interferometric arms and first and second output ports connected to second portions of the first and second interferometric arms. The optical filter acts as a selective switch exchanger for exchanging between one interferometric arm and the other at least one of a plurality of optical signals S ($\lambda 1$), S ($\lambda 2$), . . . , S ($\lambda n$), received at its input ports and for transmitting the remaining optical signals through its output ports in the first and second interferometric arms. The integrated optical add/drop device also has at least first and second optical shifters located on opposite sides of the optical filter.

19 Claims, 10 Drawing Sheets

U.S. PATENT DOCUMENTS

| | | | |
|---|---|---|---|
| 6,633,698 B2* | 10/2003 | Hatayama et al. | 385/27 |
| 6,795,654 B2* | 9/2004 | Cormack | 398/85 |
| 6,870,967 B2* | 3/2005 | Wiesmann et al. | 385/1 |
| 7,221,821 B2* | 5/2007 | Eldada | 385/24 |
| 2005/0175278 A1* | 8/2005 | Eldada | 385/24 |

FOREIGN PATENT DOCUMENTS

| | | |
|---|---|---|
| EP | 1 158 342 A2 | 11/2001 |
| JP | 2001-222033 | 8/2001 |
| WO | WO-97/50008 | 12/1997 |
| WO | WO-01/73994 A1 | 10/2001 |

OTHER PUBLICATIONS

Absil et al.; "Compact Microring Notch Filters"; IEEE, Photonics, Technology Letters, vol. 12, No. 4, pp. 1041-1043, (2000).

Offrein et al.; "Tunable Optical Add/Drop Components in Silicon-Oxynitride Waveguide Structures"; ECOC '98, pp. 325-326, (1998).

Shibata et al.; "Semiconductor Monolithic Wavelength Selective Router Using a Grating Switch Integrated With a Directional Coupler"; Journal of Lightwave Technology, vol. 14, No. 6, pp. 1027-1032, (1996).

Offrein et al.; "Resonant Coupler-Based Tunable Add-After-Drop Filter in Silicon-Oxynitride Technology for WDM Networks"; IEEE Journal of Selected Topics in Quantum Electronics, vol. 5, No.5, pp. 1400-1406, (1999).

Weiershausen et al.; "Photonic Highway Switches Based on Ring Resonators Used as Frequency-Selective Components"; Applied Optics, vol. 35, No. 30, pp. 5967-5977. (1996).

Kohnke et al.; "Silica Based Mach-Zehnder Add-Drop Filter Fabricated With UV Induced Gratings"; Electronics Letters, vol. 32, No. 17, pp. 1579-1580, (1996).

" Spectral Grids for WDM Applications: CWDM Wavelength Grid"; Series G: Transmission Systems and Media, Digital Systems and Networks, International Telecommunication Union, ITU-T Recommendation G.694.2, pp. i-iii, and pp. 1-3, (2002).

P.P. Absil et al., "Compact Microring Notch Filters," IEEE Photonics Technology Letters, vol. 12, No. 4, pp. 398-400, Apr. 2000.

* cited by examiner

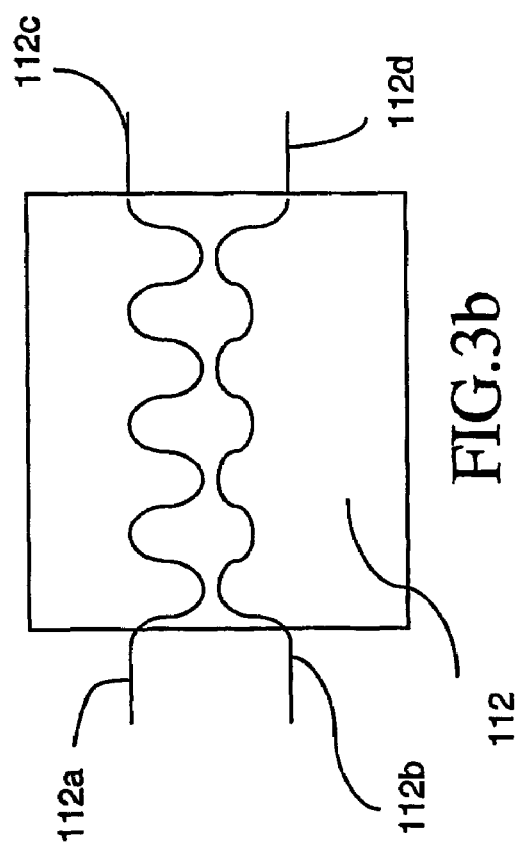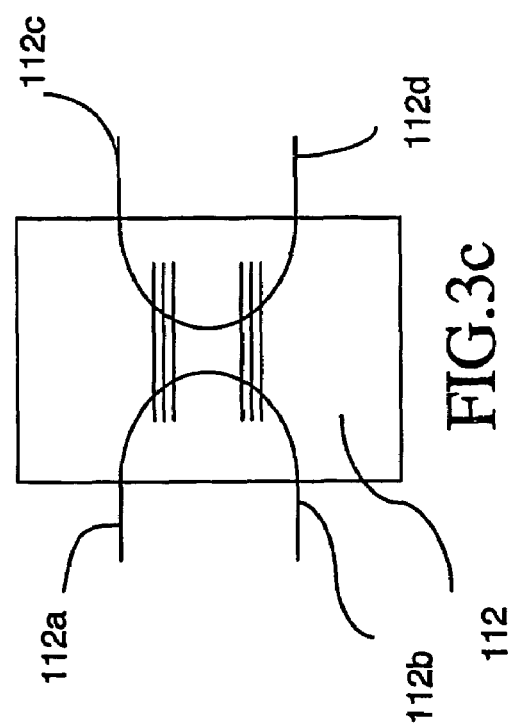

INTEGRATED OPTICAL ADD/DROP DEVICE HAVING SWITCHING FUNCTION

CROSS REFERENCE TO RELATED APPLICATION

This application is a national phase application based on PCT/EP2002/014812, filed Dec. 31, 2002, the content of which is incorporated herein by reference.

BACKGROUND OF THE INVENTION

1. Field of the Invention

The present invention generally relates to the field of integrated optics, and particularly to integrated optical add/drop devices for Wavelength Division Multiplexing (WDM) optical communication systems. More specifically, the present invention relates to an integrated optical add/drop device having switching function.

2. Description of the Related Art

In WDM optical communications, a plurality of mutually independent optical signals are multiplexed in the optical wavelength domain and sent along a line, comprising optical fibers or integrated waveguides; the optical signals can be either digital or analogue, and they are distinguished from each other in that each of them has a specific wavelength, distinct from those of the other optical signals.

In the practice, specific wavelength bands of predetermined amplitude, also referred to as channels, are assigned to each of the optical signals at different wavelengths. The channels, each identified by a respective wavelength value called the channel central wavelength, have a certain spectral amplitude around the central wavelength value, which depends, in particular, on the characteristics of the optical signal source laser and on the modulation imparted thereto for associating an information content with the optical signal. Typical values of spectral separation between adjacent channels are 1.6 nm and 0.8 nm for the so-called Dense WDM (shortly, DWDM), and 20 nm for Coarse WDM (CWDM—ITU Recommendation No. G.694.2).

In order to be able to access different wavelength channels, an optical signal or power that is transmitted on one channel and carries, for example, message or signalling information must be essentially removed (dropped). The channel from which the optical signal has been dropped can be occupied with a new optical signal or power (added) that, for example, can contain message or signalling information. This method of removing an optical signal from a channel and then re-occupying this optical channel is known as the add/drop method.

There are various possibilities for realizing such an add/drop method: a) the optical signals transmitted on the various wavelength channels are wavelength-division demultiplexed and the add/drop method is implemented with the assistance of a suitable waveguide structure and, subsequently, the optical signals including the optical signal re-occupying the one channel are again multiplexed; or b) a passive optical add/drop filter, for example a Mach-Zehnder Interferometer composed of, planar glass waveguides, is employed.

In transmission systems in which there is no fixed channel routing, adjustable or, respectively, tunable waveguide structures or filters should be employed. In Case a), this can be achieved by using the add/drop method with the assistance of an array of optical switches, which comprises waveguide structures or that is present in addition to the waveguide structure. In Case b), the method is implemented with the assistance of an adjustable or, respectively, tunable add/drop filter.

The adjustable add/drop filter is a key component for wavelength-division multiplexing networks (WDM networks).

A wide variety of such add/drop filters are known in the art.

In U.S. Pat. No. 5,812,709 an optical device having switching function is disclosed. The optical device has a waveguide filter for switching whether input signal light of wavelength including at least one specific wavelength should be transmitted or reflected. The input signal lights of wavelength $\lambda_1 \sim \lambda_n$ are transmitted to the input waveguide. When the waveguide filter is off, the signal lights of all wavelengths are transmitted to the output port. When the waveguide filter is on, the signal lights of wavelength $\lambda_2 \sim \lambda_n$ are transmitted, but the signal light of wavelength $\lambda_1$ is reversed and output to the drop port.

The Applicant has observed that due to the fact that the waveguide filter is reflective, the input signal light at $\lambda_1$, which is input from the input port, is reflected and transmitted backwards to the input port. An optical circulator is therefore necessary to drop this signal.

In EP 0903616A a different type of switchable optical filter is disclosed. This filter comprises a Mach-Zehnder interferometer comprising a pair of waveguide arms extending between a pair of couplers. The arms include a series of phase shifters in at least one arm separated by reflective filters on both arms. By adjusting the phase shifters, the reflection by the filter of signals at wavelengths corresponding to the reflective filters can be adjusted independently.

SUMMARY OF THE INVENTION

The Applicant has observed that, also in this kind of switchable optical filter, optical circulators are needed for separating the drop channels from the input port and the add channels from the through output.

However, the Applicant has observed that optical circulators can not be easily integrated in the same chip of optical filters due to the fact that optical circulators are non-reciprocal components.

The Applicant faced the problem of realizing an integrated optical add/drop device having switching function without using optical circulators. In this way, the integrated optical add/drop device can be integrated in a single chip.

In particular, the Applicant has found that this problem can be solved by realizing an integrated optical add/drop device having switching function for use in Wavelength Division Multiplexing (WDM) optical communication systems, said integrated optical add/drop device having an input port for receiving a wavelength division multiplexed optical signal $S_{IN}\{S(\lambda 1), S(\lambda 2), \ldots, S(\lambda n)\}$ made up of a plurality of optical signals $S(\lambda 1), S(\lambda 2), \ldots, S(\lambda n)$ and comprising an optical filter interposed between respective first and second portions of a first and a second interferometric arm of an Interferometer, preferably a Mach Zehnder Interferometer; this optical filter acting as a selective switch exchanger for exchanging at least one optical signal $S(\lambda 1), S(\lambda 2), \ldots, S(\lambda n)$ between one interferometric arm to the other and for transmitting the remaining optical signals through the two interferometric arms. These first and second interferometric arms are extended between a pair of optical couplers, preferably directional optical couplers. The integrated optical add/drop device comprises at least first and second phase shifters located on opposite sides of the optical filter with respect to the optical couplers.

According to an aspect of the present invention, there is provided an integrated optical add/drop device having switching function for use in Wavelength Division Multiplexing (WDM) optical communication systems. The integrated optical add/drop device comprises first and second interferometric arms of an Interferometer. The integrated optical add/drop device further comprises an optical filter having first and second input ports and first and second output ports, said first input port being connected to a first portion of said first interferometric arm, said second input port being connected to a first portion of said second interferometric arm, said first output port being connected to a second portion of said first interferometric arm, said second output port being connected to a second portion of said second interferometric arm. The optical filter acts as a selective switch exchanger for exchanging between one interferometric arm to the other at least one of a plurality of optical signals S(λ1), S(λ2), ..., S(λn) received at its input ports and for transmitting the remaining optical signals through its output ports in said first and second interferometric arms. The integrated optical add/drop device also comprises at least first and second optical shifters located on opposite sides of the optical filter.

Preferably the optical filter is a tunable optical filter.

Each of the first and the second phase shifter introduces a phase shift of 0±2πN into each optical signal S1(λ1), S2(λ2), ..., Sn(λn) propagating in said first and second interferometric arms when it is in a first state.

Moreover, each of the first and the second phase shifter introduces a phase shift of π/2±2πN into each optical signal S1(λ1), S2(λ2), ..., Sn(λn) propagating in said first and second interferometric arms when it is in a second state.

In a first embodiment of the present invention each phase shifter is located in a different interferometric arm.

In particular, said first phase shifter is located in said first portion of said first interferometric and said second phase shifter is located in said second portion (110b) of said second interferometric arm.

In a second embodiment of the present invention, said first and second phase shifters are both located on a same one of said first and second interferometric arms.

In particular, said first phase shifter is located in said first portion of said first interferometric and said second phase shifter is located in said second portion of said first interferometric arm.

Preferably, the Interferometer (111) is a Mach Zehnder Interferometer.

According to another aspect of the present invention, there is provided a method for adding or dropping optical signals in Wavelength Division Multiplexing (WDM) optical communications, comprising the steps of:

sending a plurality of optical signals S(λ1), S(λ2), ..., S(λn) to respective first portions of first and second interferometric arms;

exchanging between one interferometric arm to the other at least one of said plurality of optical signals S(λ1), S(λ2), ..., S(λn);

transmitting the remaining optical signals in respective second portions of said first and second interferometric arms; and introducing a phase shift on at least one of said first portions and at least one of said second portions of said first and second interferometric arms for switching said integrated optical add/drop device from a first state to a second state.

BRIEF DESCRIPTION OF THE DRAWINGS

The features and advantages of the present invention will be made apparent by the following detailed description of some embodiments thereof, provided merely by way of non-limitative examples, which will be made referring to the attached drawings, wherein:

FIGS. 3a and 3b and 3c are schematic views of implementations of a component of the integrated optical add/drop device of FIGS. 2a and 2b;

DETAILED DESCRIPTION OF THE INVENTION

Figure 1:
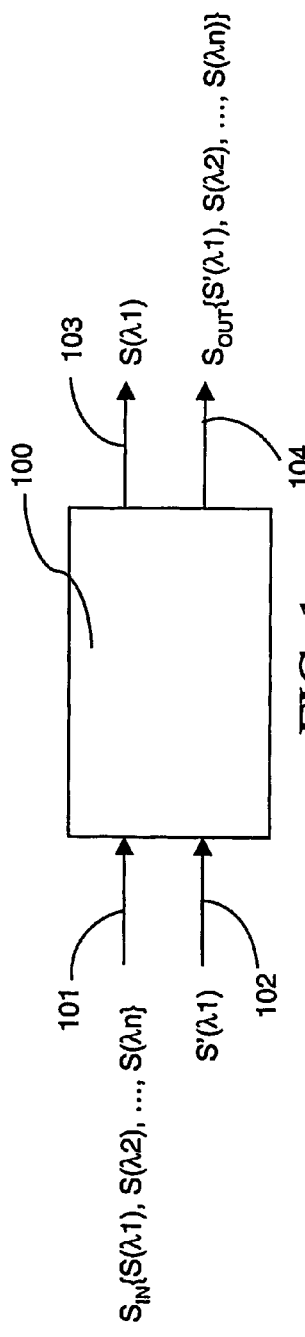
FIG. 1 is a symbolic representation of an integrated optical add/drop device realized according to a first embodiment of the present invention.
Figure 2A:
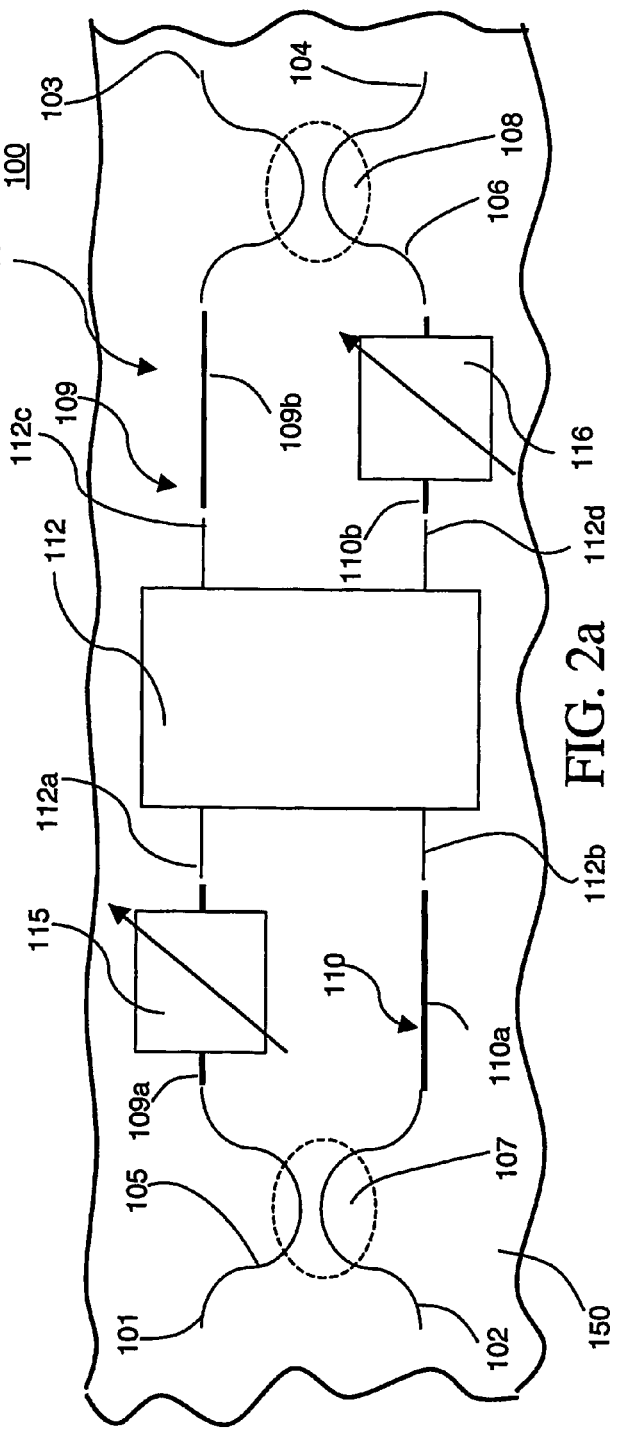
FIGS. 2a and 2b are schematic views of the integrated optical add/drop device of FIG. 1.
Figure 2B:
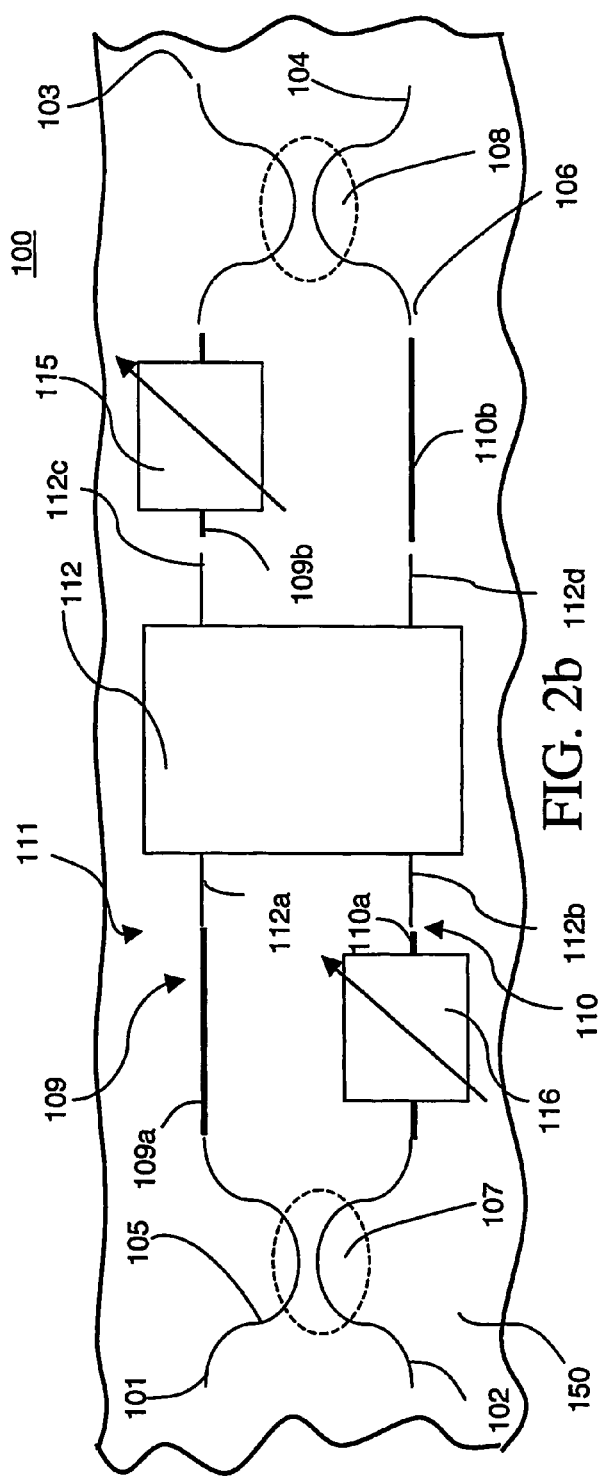

FIGS. 1, 2a and 2b schematically show an integrated optical add/drop device 100 having switching function realized according to a first embodiment of the present invention.

Preferably, the integrated optical device 100 is a four-ports optical device having first and second input ports 101, 102 and first and second output ports 103, 104. In this first embodiment the first input port 101 acts as an input port for receiving a wavelength division multiplexed optical signal $S_{IN}\{S(\lambda 1), S(\lambda 2), \ldots, S(\lambda n)\}$ made up of a plurality (two or more) of optical signals S(λ1), S(λ2), ..., S(λn). Each of the optical signals S(λ1), S(λ2), ..., S(λn) is assigned a respective wavelength band (also referred to as a channel) centred on a respective wavelength λ1, λ2, ..., λn (also referred to as the channel central wavelength).

The first output port 103 acts as a drop port for producing an optical signal S(λ1) extracted (dropped) from the multiplexed optical signal $S_{IN}\{S(\lambda 1), S(\lambda 2), \ldots, S(\lambda n)\}$; the dropped optical signal S(λ1) can thus be routed to a prescribed recipient, for example a user home appliance such as a television set, a telephone set, a personal computer and the like, wherein the optical signal is transformed into a corresponding electrical signal by means of a photodetector (not shown).

The second input port 102 acts as an add port for receiving an optical signal S'(λ1), generated for example by a user home appliance laser source and centred on the same wavelength λ1 as the dropped optical signal S(λ1); the optical signal S'(λ1) is added to the remaining optical signals S(λ2), ..., S(λn).

The second output port 104 acts as a through port for producing a new multiplexed optical signal $S_{OUT}${S'(λ1), S(λ2), ..., S(λn)} resulting from the combination of the original optical signals S(λ2), ..., S(λn) not dropped, and the added optical signal S'(λ1).

As shown in FIGS. 2a and 2b, the first embodiment of the integrated optical add/drop device 100 comprises first and second optical waveguides 105, 106 preferably arranged so as to be in optical coupling relationship in spaced-apart first and second optical coupling regions 107, 108, wherein the two optical waveguides 105, 106 are in close proximity to each other. Each optical coupling region 107, 108 forms an optical coupler transferring a predetermined fraction of the optical power propagating along either one of the two optical waveguides 105, 106 to the other optical waveguide. Preferably the optical coupler is a 50/50 (also referred to as 3 dB) directional optical coupler: a half of the optical power propagating along either one of the two optical waveguides 105, 106 is transferred to the other optical waveguide. First and second sections of the first optical waveguides 105, located between the first and the second optical coupling region 107, 108 form respectively first and second portions 109a, 109b of an interferometric arm 109 of an Interferometer 111, preferably a Mach-Zehnder Interferometer hereinafter shortly referred to as MZI. Similarly, first and second sections of the second optical waveguides 106 located between the first and the second optical coupling region 107, 108 form respectively first and second portions 110a, 110b of a second interferometric arm 110 of the MZI 111. The first and the second portion 109a, 109b of the first interferometric arm 109 and the first and the second portion 110a, 110b of the second interferometric arm 110 are sufficiently spaced apart from each other so as to be optically uncoupled.

Still with reference to FIGS. 2a and 2b, an end of the first optical waveguide 105, adjacent the first optical coupler 107, forms the first input port 101 of the integrated optical add/drop device 100; an opposite end of the first optical waveguide 105, adjacent the second optical coupler 108, forms the first output port 103. An end of the second optical waveguide 106, adjacent the first optical coupler 107, forms the second input port 102; an opposite end of the second optical waveguide 106, adjacent the second optical coupler 108, forms the second output port 104.

The integrated optical add/drop device 100 is a monolithic device integrated in a single chip, schematically shown in FIGS. 2a and 2b and denoted therein by 150, and the two optical waveguides 105, 106 are preferably integrated planar waveguide.

Furthermore, the integrated optical add/drop device 100 comprises an optical filter 112 interposed between the first and the second portion 109a, 109b of the first interferometric arm 109 and the first and the second portion 110a, 110b of the second interferometric arm 110. In detail, the optical filter 112 has: a first input port 112a connected to the first portion 109a of the first interferometric arm 109; a second input port 112b connected to the first portion 110a of the second interferometric arm 110; a first output port 112c connected to the second portion 109b of the first interferometric arm 109; a second output port 112d connected to the second portion 110b of the second interferometric arm 110.

For the purpose of the present invention the optical filter 112 acts as a selective switch exchanger for exchanging at least an optical signal S(λ1), S(λ2), ..., S(λn) between one interferometric arm to the other and for transmitting the remaining optical signals. Preferably the optical filter 112 is a tunable optical filter.

Figure 3A:
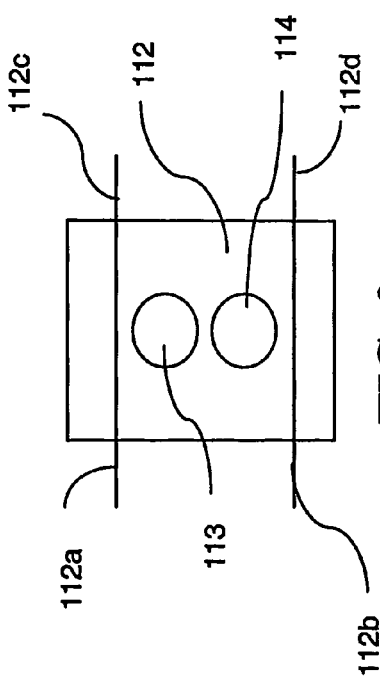

An implementation of the optical filter 112 is shown in FIG. 3a. In this implementation the optical filter 112 comprises an even numbers of resonator-cavity loops (for example first and second resonator-cavity loops 113, 114) accommodated between the first and the second optical waveguide 105, 106. Preferably, the resonator-cavity loops are coupled in series. In a series coupled arrangement each resonator is mutually coupled. As a consequence, an optical signal that is to be dropped from the input port to the drop port must pass sequentially through each resonator. Because of this sequential power transfer, all resonators must be precisely resonant at least at one common wavelength. The resulting resonant line shape in the series case is determined physically by the separations between resonators. Resonator-cavity loops of the type above-mentioned are for example described in U.S. Pat. No. 6,052,495.

Although resonator-cavity loops are exemplified here, the Applicant has observed that any other implementation of the optical filter 112 acting as a selective switch exchanger may be employed for the purpose of the present invention. In particular, the optical filter 112 may be realized using cascaded optical couplers subdivided by MZI sections having different interferometric arm lengths (FIG. 3b). Cascaded optical couplers subdivided by MZI sections having different interferometric arm lengths are for example described in B. J Offrein. et al., "Tunable optical Add/Drop Components in Silicon-Oxynitride Waveguide Structures", 24th European Conference on Optical Communication. ECOC '98 (IEEE Cat. No. 98TH8398), Vol. 1, p. 325-6. The optical filter 112 may be also realized using n-shifted optical grating realized on coupler (FIG. 3c).

Moreover, the integrated optical add/drop device 100 includes at least first and second variable phase shifters 115, 116 located on opposite sides of the optical filter 112 with respect to the optical couplers 107, 108. The two phase shifters 115, 116 introduce substantially the same phase shift into each optical signal S1(λ1), S2(λ2), ..., Sn(λn) propagating in and through the interferometric arms 109, 110. As shown in FIGS. 2a and 2b, in this first embodiment of the integrated optical add/drop device 100, each phase shifter 115, 116 is located in a respective interferometric arm 109, 110 of the MZI 111.

More specifically, with reference to FIG. 2a, the first phase shifter 115 is located in the first portion 109a of the first interferometric arm 109 while the second phase shifter 116 is located in the second portion 110b of the second interferometric arm 110. Alternatively, the first phase shifter 115 is located in the second portion 109b of the first interferometric 109 while the second phase shifter 116 is located in the first portion 110a of the second interferometric arm 110, as shown in FIG. 2b.

Variable phase shifters 115, 116 can be heated thermo-optic phase shifters (for example thin film heaters arranged over a thermo-optic waveguide) providing a phase change proportional to the temperature as follows:

$$\phi_n = \frac{2\pi}{\lambda_n}\left(\frac{dn}{dT}\Delta T\right)L_{Htr}$$

where $L_{Htr}$ is the length of the heater, $\Delta T$ is the temperature change and $dn/dT$ is the effective index change of the fundamental mode with respect to temperature. Alternatively, variable phase shifters 115, 116 may be realized by introducing small sections of non linear polymers for changing the phase via the electro-optic effect. Other tuning mechanisms are for example carrier injection and optically induced refractive index change.

Figure 4:
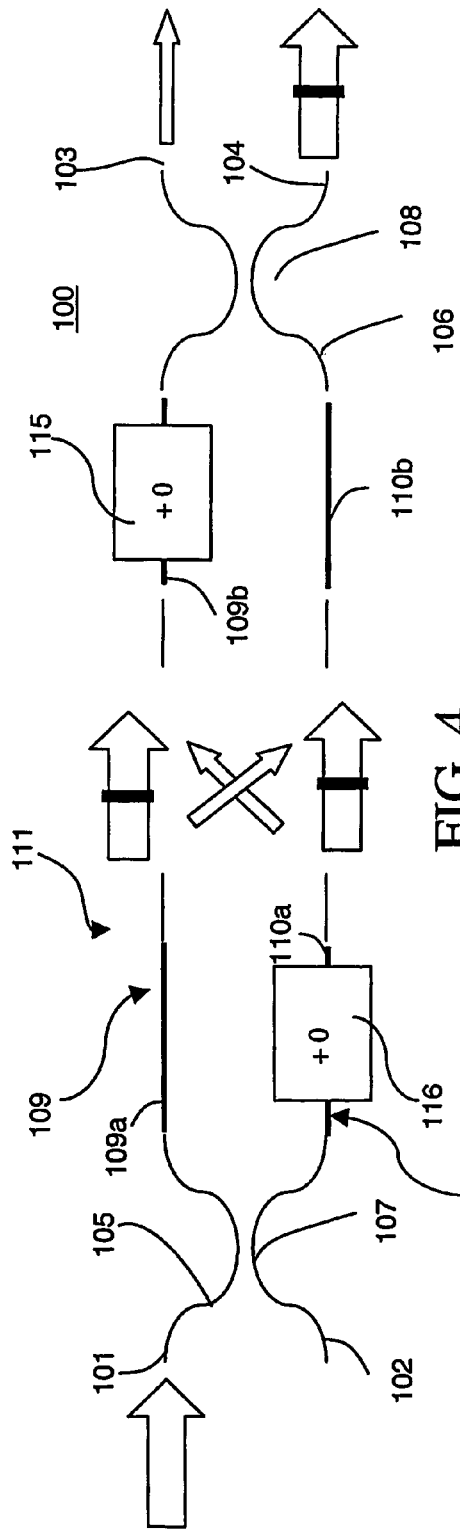
FIGS. 4 and 5 schematically show the operation of the integrated optical add/drop device of FIG. 2b.
Figure 5:
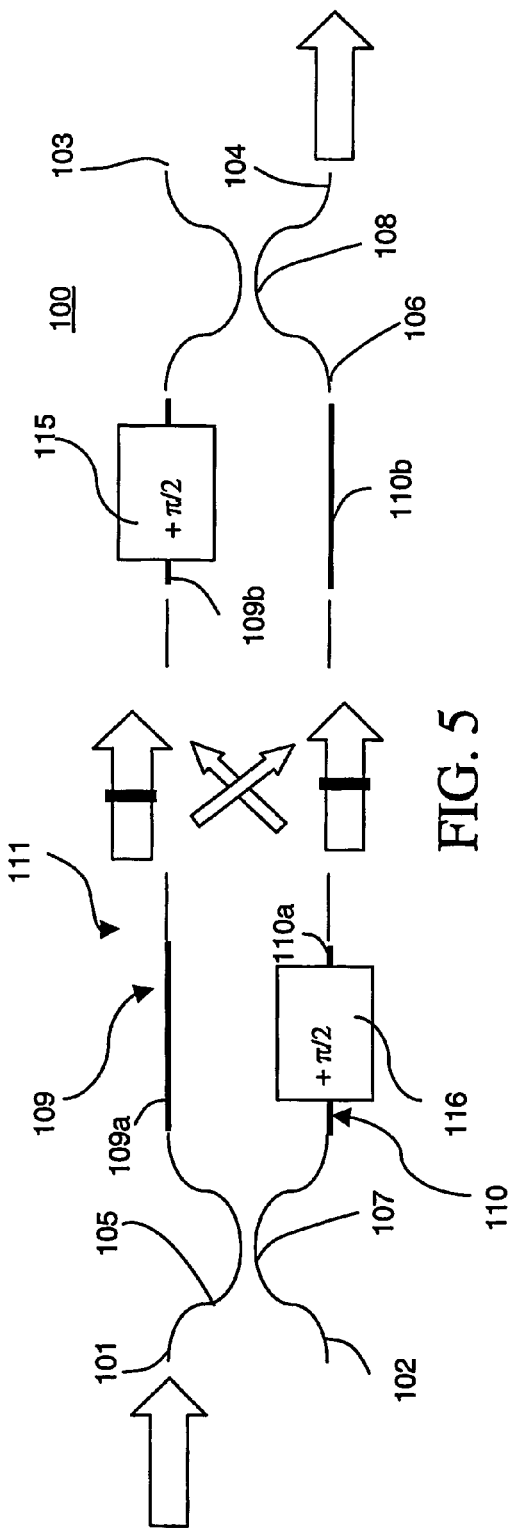

The operation of the first embodiment of the integrated optical add/drop device 100 will be now explained making reference to the schematic view of FIGS. 4 and 5.

When the multiplexed optical signal $S_{IN}\{S(\lambda 1), S(\lambda 2), \ldots, S(\lambda n)\}$ entering from the first input port 101 and propagating through the first optical waveguide 105 reaches the first optical coupler 107, a half of the optical power is shifted of $\pi/2$ in its phase and transferred to the second optical waveguide 106 by this first optical coupler 107; as a consequence, two half-power multiplexed optical signals, indicated as $\frac{1}{2}[S_{IN}\{S(\lambda 1), S(\lambda 2), \ldots, S(\lambda n)\}]$ propagate through the first portion 109a of the first interferometric arm 109 and respectively through the first portion 110a of the second interferometric arm 110; the half-power multiplexed optical signal $\frac{1}{2}[S_{IN}\{S(\lambda 1), S(\lambda 2), \ldots, S(\lambda n)\}]$ propagating through the first portion 110a of the second interferometric arm 110 being in phase quadrature ($\pi/2$ phase shift) compared to the half-power multiplexed optical signal $/1;2[S_{IN}\{S(\lambda 1), S(\lambda 2), \ldots, S(\lambda n)\}]$ propagating through the first portion 109a of the first interferometric arm 109.

With reference to FIG. 4, in an ON-state of the integrated optical add/drop device 100, the two phase shifters 115, 116 are in an OFF-state, corresponding to the introduction of a phase shift of $0\pm 2\pi N$. In this situation, the two half-power multiplexed optical signals $\frac{1}{2}[S_{IN}\{S(\lambda 1), S(\lambda 2), \ldots, S(\lambda n)\}]$ reach the optical filter 112 in phase quadrature. The optical filter 112 exchanges from one interferometric arm to the other only the two half-power optical signals $\frac{1}{2}[S(\lambda 1)]$ centred on the wavelength $\lambda 1$, which must be dropped, while the remaining two half-power multiplexed optical signals, indicated by $\frac{1}{2}[S_{IN}\{S(\lambda 2), \ldots, S(\lambda n)\}]$, are transmitted on the respective interferometric arms 109, 110 by the optical filter 112. When the two exchanged half-power optical signals $\frac{1}{2}[S(\lambda 1)]$ propagating through the second portion 109b of the first interferometric arm 109 and respectively through the second portion 110b of the second interferometric arm 110 reach the second optical coupler 108, an additional $\pi/2$ phase shift, introduced by this second optical coupler 108, causes them to constructively recombine in the first optical waveguide 105. As a consequence, a full-power optical signal $S(\lambda 1)$ is made available at the first output port 103 of the integrated optical add/drop device 100. Similarly, when the two transmitted half-power multiplexed optical signals $\frac{1}{2}[S_{IN}\{S(\lambda 2), \ldots, S(\lambda n)\}]$ reach the second optical coupler 108, the additional $\pi/2$ phase shift, introduced by this second optical coupler 108, causes them to constructively recombine in the second optical waveguide 106. As a consequence, a full-power multiplexed optical signal $S_{IN}\{S(\lambda 2), \ldots, S(\lambda n)\}$ is made available at the second output port 104 of the integrated optical add/drop device 100.

The integrated optical add/drop device 100 also allows adding a new signal $S'(\lambda 1)$, centred on the same wavelength $\lambda 1$ as the dropped signal $S(\lambda 1)$, to the full-power multiplexed optical signal $S_{IN}\{S(\lambda 2), \ldots, S(\lambda n)\}$, thereby obtaining the multiplexed output optical signal $S_{OUT}\{S'(\lambda 1), S(\lambda 2), \ldots, S(\lambda n)\}$. If the new signal $S'(\lambda 1)$ is fed to the second input port 102 of the integrated optical add/drop device 100 and propagated through the second optical waveguide 106, when such a new signal $S'(\lambda 1)$ reaches the first optical coupler 107, a half of the optical power is shifted of $\pi/2$ in its phase and transferred to the first optical waveguide 105 by this first optical coupler 107; as a consequence, two half-power optical signals $\frac{1}{2}[S'(\lambda 1)]$, in phase quadrature, propagate through the first portion 109a of the first interferometric arm 109 and respectively through the first portion 110a of the second interferometric arm 110. These two half-power optical signals $\frac{1}{2}[S'(\lambda 1)]$ are exchanged from one interferometric arm to the other by the optical filter 112. When the two exchanged half-power optical signals $\frac{1}{2}[S'(\lambda 1)]$ propagating through the second portion 109b of the first interferometric arm 109 and respectively through the second portion 110b of the second interferometric arm 110 reach the second optical coupler 108, the additional phase of $\pi/2$, introduced by this second optical coupler 108, cause them to constructively recombine in the second optical waveguide 106. As a consequence, a full-power optical signal $S'(\lambda 1)$ is made available at the second output port 104 of the integrated optical add/drop device 100. This full-power optical signal $S'(\lambda 1)$, together with the full-power multiplexed optical signal $S_{IN}\{S(\lambda 2), \ldots, S(\lambda n)\}$ forms the multiplexed output optical signal $S_{OUT}\{S'(\lambda 1), S(\lambda 2), \ldots, S(\lambda n)\}$.

With reference to FIG. 5, in an OFF-state of the integrated optical add/drop device 100 the two phase shifters 115, 116 are in an ON-state, corresponding to the introduction of a phase shift of $\pi/2\pm 2\pi N$. In this situation, the half-power multiplexed optical signal $\frac{1}{2}[S_{IN}\{S(\lambda 1), S(\lambda 2), \ldots, S(\lambda n)\}]$ propagating through the first portion 109a of the first interferometric arm 109 reaches the optical filter 112 maintaining its phase while the half-power multiplexed optical signal $\frac{1}{2}[S_{IN}\{S(\lambda 1), S(\lambda 2), \ldots, S(\lambda n)\}]$ propagating through the first portion 110a of the second interferometric arm 110 is shifted of $\pi/2\pm 2\pi N$ in its phase by the second phase shifter 116 before reaching the optical filter 112.

Also in this case, the optical filter 112 exchanges from one interferometric arm to the other only the two half-power optical signals $\frac{1}{2}[S(\lambda 1)]$ centred on the wavelength $\lambda 1$ while the remaining two half-power multiplexed optical signals $\frac{1}{2}[S_{IN}\{S(\lambda 2), \ldots, S(\lambda n)\}]$ are transmitted on the respective interferometric arms 109, 110 by the optical filter 112.

Then, the exchanged half-power optical signal $\frac{1}{2}[S(\lambda 1)]$ and the transmitted half-power multiplexed optical signals $\frac{1}{2}[S_{IN}\{S(\lambda 2), \ldots, S(\lambda n)\}]$ propagating through the second portion 109b of the first interferometric arm 109 are shifted of $\pi/2\pm 2\pi N$ in their phases by the first phase shifter 115 while the exchanged half-power optical signal $\frac{1}{2}[S(\lambda 1)]$ and the transmitted half-power multiplexed optical signals $\frac{1}{2}[S_{IN}\{S(\lambda 2), \ldots, S(\lambda n)\}]$ propagating through the second portion 110b of the second interferometric arm 110 maintain their phases. In this situation, when the two exchanged half-power optical signals $\frac{1}{2}[S(\lambda 1)]$ propagating through the second portion 109b of the first interferometric arm 109 and respectively through the second portion 110b of the second interferometric arm 110 reach the second coupler 108, an additional $\pi/2$ phase shift introduced by this second optical coupler 108, causes them to constructively recombine in the second optical waveguide 106. As a consequence, a full-power optical signal $S(\lambda 1)$ is made available at the second output port 104 of the integrated optical add/drop device 100. Similarly, the two transmitted half-power multiplexed optical signals $\frac{1}{2}[S_{IN}\{S(\lambda 2), \ldots, S(\lambda n)\}]$ constructively recombine in the second optical waveguide 106 when they pass through the second optical coupler 108, thereby causing a full-power multiplexed optical signal $S_{IN}\{S(\lambda 2), \ldots, S(\lambda n)\}$ being available at the second output port 104 of the integrated optical add/drop device 100.

The full-power optical signal S(λ1), together with the full-power multiplexed optical signal $S_{IN}\{S(\lambda2), \ldots, S(\lambda n)\}$ form again the original multiplexed optical signal $S_{IN}\{S(\lambda1), S(\lambda2), \ldots, S(\lambda n)\}$.

Due to the fact that the two exchanged half-power optical signals ½[S(λ1)] and the two transmitted half-power multiplexed optical signals ½[$S_{IN}\{S(\lambda2), \ldots, S(\lambda n)\}$] destructively recombine in the first optical waveguide 105 when they pass through the second optical coupler 108, no guided optical signals among those input at the input port 101 of the integrated optical add/drop device 100 are made available at the first output port 103 of the integrated optical add/drop device 100.

Furthermore, in the OFF-state of the integrated optical add/drop device 100, when an optical signal S'(λ1) centred on the wavelength λ1 enters in the second input port 102, it is made available at the first output port 103.

It can be appreciated that, during the OFF-state of the integrated optical add/drop device 100, the optical filter 112 can be easily tuned (using well-known techniques) leaving essentially undisturbed all channels located between the previously tuned set channel and the new tuned set channel.

The integrated optical add/drop device 100 operates substantially in the same way when the two phase shifters 115, 116 are located respectively in the first portion 109a of the first interferometric arm 109 and in the second portion 110b of the second interferometric arm 110.

Figure 6:
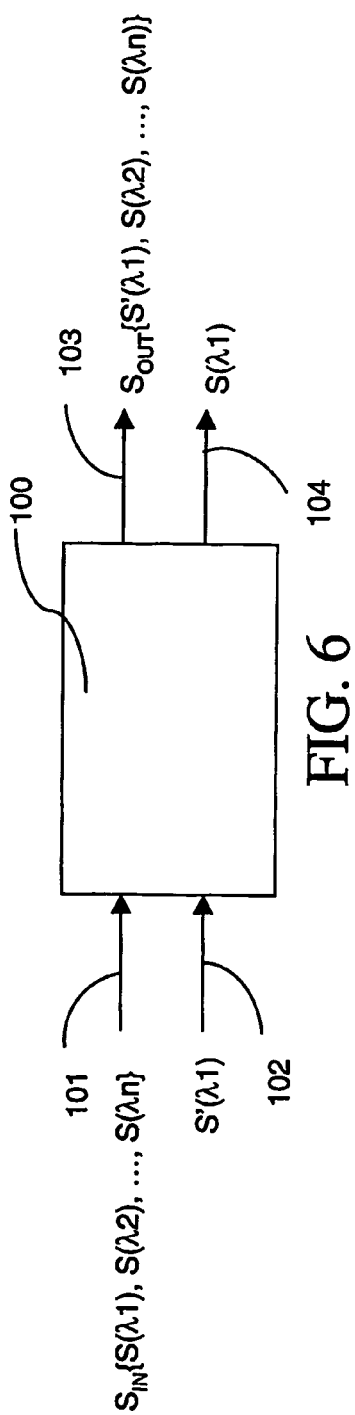
FIG. 6 is a symbolic representation of an integrated optical add/drop device realized according to a second embodiment of the present invention.
Figure 7A:
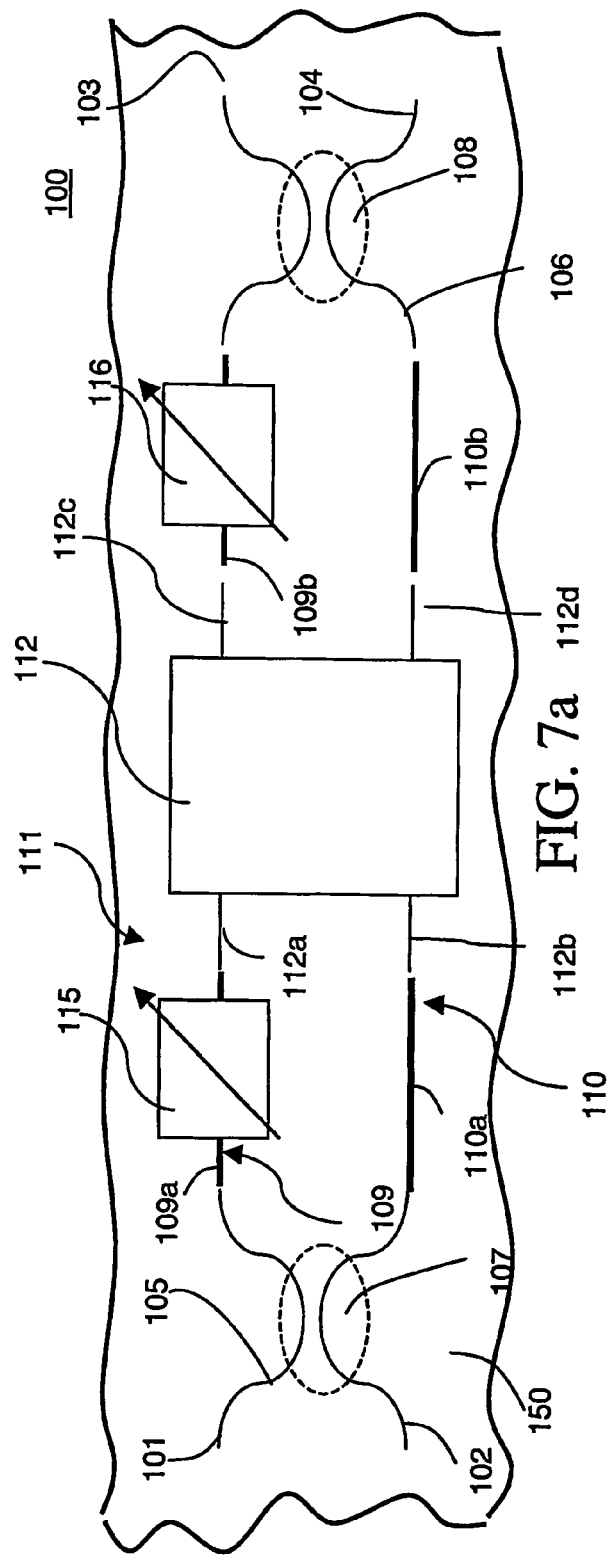
FIGS. 7a and 7b are schematic views of the integrated optical add/drop device of FIG. 6.
Figure 7B:
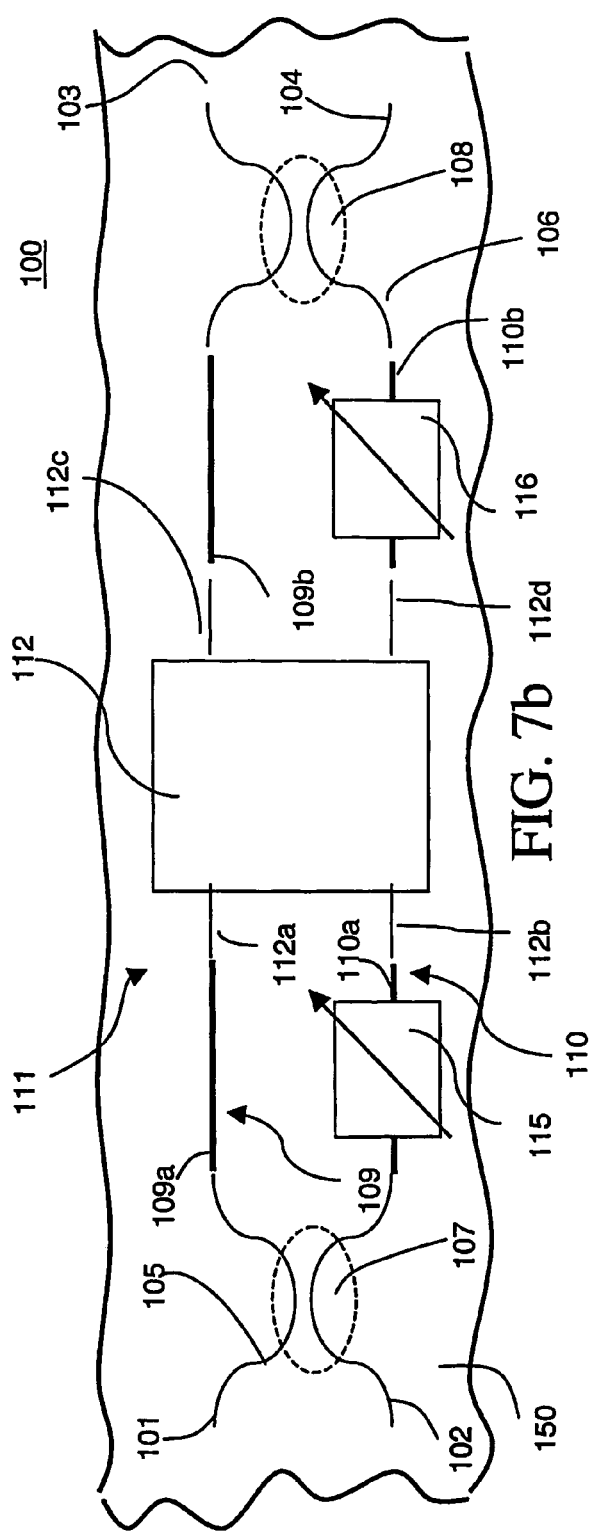

FIGS. 6, 7a, 7b schematically show the integrated optical add/drop device 100 having switching function realized according to a second embodiment of the present invention.

In greater detail, the second embodiment of the integrated optical add/drop device 100 differs from the first embodiment of the integrated optical add/drop device 100, shown in FIGS. 1, 2a and 2b, in having the first output port 103 acting as a through port and the second output port 104 acting as a drop port.

Figure 8A:
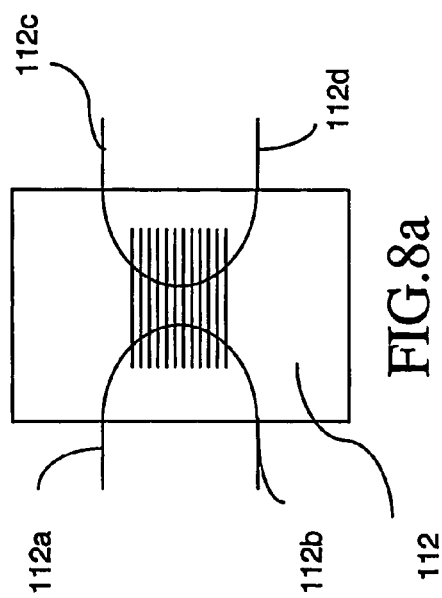
FIGS. 8a and 8b are schematic views of implementations of a component of the integrated optical add/drop device of FIGS. 7a and 7b.
Figure 8B:
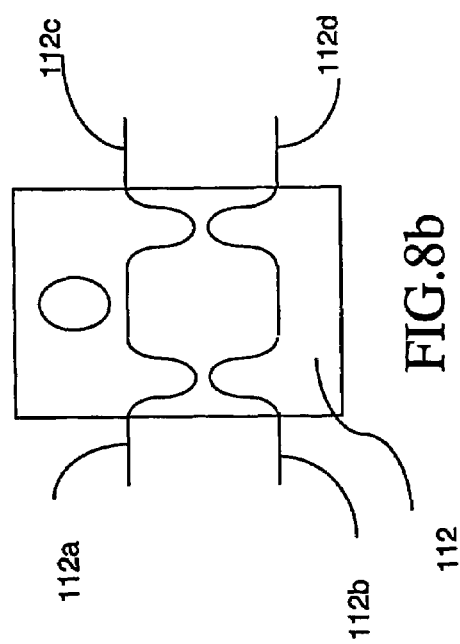

In this second embodiment the optical filter 112 is realized by means of optical gratings on coupler (FIG. 8a) described for example in Y. Shibata et al,. "Semiconductor Monolithic Wavelength Selective Router Using a Grating Switch Integrated with a Directional Coupler", Journal of Lightwave Technology, Vol. 14,no. 6, p. 1027-32. Alternatively, the optical filter 112 may be realized by means of a symmetric MZI coupled to a resonator-cavity loop introducing a π phase shift only at a resonant wavelength (FIG. 8b) as described for example in P. P. Absil et al, "Compact Microring notch filters" IEEE Photonics Technology Letters, Vol. 12,no. 4, p. 398-400.

As shown in FIGS. 7a and 7b, in this second embodiment of the integrated optical add/drop device 100 the first and the second phase shifters 115, 116 are located on the same interferometric arm of the MZI 111.

More specifically, with reference to FIG. 7a, the first phase shifter 115 is located in the first portion 109a of the first interferometric 109 while the second phase shifter 116 is located in the second portion 109b of the first interferometric arm 109. Alternatively, the first phase shifter 115 is located in the first portion 110a of the second interferometric 110 while the second phase shifter 116 is located in the second portion 110b of the second interferometric arm 110, as shown in FIG. 7b.

Figure 9:
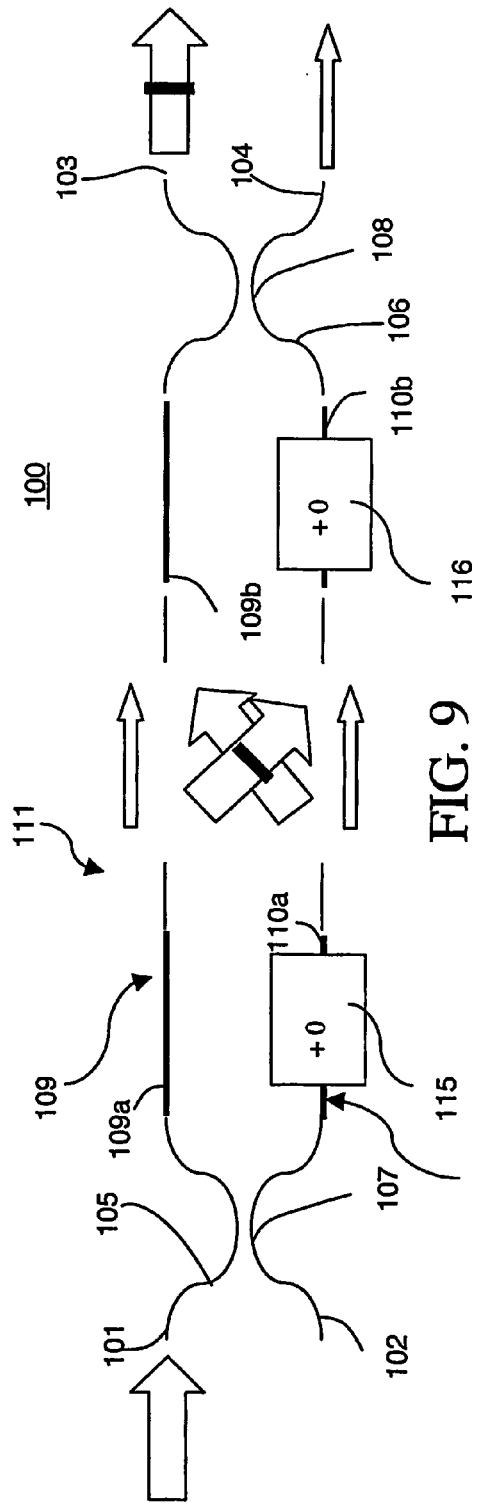
FIGS. 9 and 10 schematically show the operation of the integrated optical add/drop device of FIG. 7b.
Figure 10:
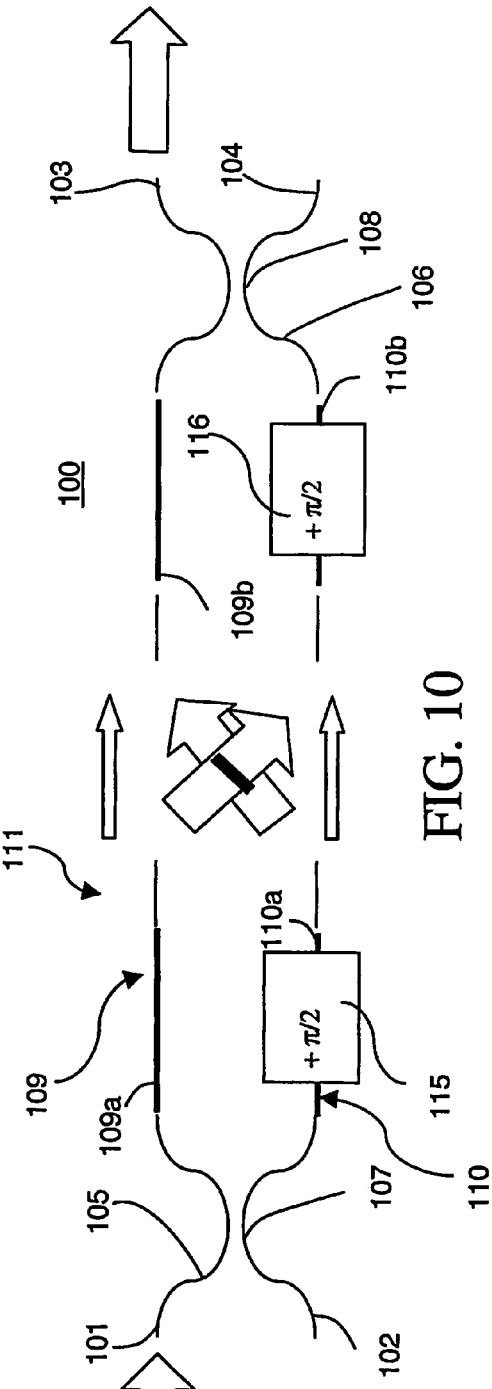

The operation of the second embodiment of the integrated optical add/drop device 100 will be now explained making reference to the schematic view of FIGS. 9 and 10.

When the multiplexed optical signal $S_{IN}\{S(\lambda1), S(\lambda2), \ldots, S(\lambda n)\}$ entering from the first input port 101 and propagating through the first optical waveguide 105 reaches the first optical coupler 107, a half of the optical power is shifted of π/2 and transferred to the second optical waveguide 106 by this first optical coupler 107; as a consequence, two half-power multiplexed optical signals, indicated as ½[$S_{IN}\{S(\lambda1), S(\lambda2), \ldots, S(\lambda n)\}$] propagate through the first portion 109a of the first interferometric arm 109 and through the first portion 110a of the second interferometric arm 110; the half-power multiplexed optical signal ½[$S_{IN}\{S(\lambda1), S(\lambda2), \ldots, S(\lambda n)\}$] propagating through the second portion 110a of the second interferometric arm 110 being in phase quadrature (π/2 phase shift) compared to the half-power multiplexed optical signal ½[$S_{IN}\{S(\lambda1), S(\lambda2), \ldots, S(\lambda n)\}$] propagating through the first portion 109a of the first. interferometric arm 109.

With reference to FIG. 9, in an ON-state of the integrated optical add/drop device 100, the two phase shifters 115, 116 are in an OFF-state, corresponding to the introduction of a phase shift of 0±2πN degrees. In this situation, the two half-power multiplexed optical signals ½[$S_{IN}\{S(\lambda1), S(\lambda2), \ldots, S(\lambda n)\}$] reach the optical filter 112 in phase quadrature. Then, the optical filter 112 transmits on the respective interferometric arms 109, 110 the two half-power optical signals ½[S(λ1)] centred on the wavelength λ1, which must be dropped. Further, the optical filter 112 exchanges the remaining two half-power multiplexed optical signals, indicated by ½[$S_{IN}\{S(\lambda2), \ldots, S(\lambda n)\}$], from one interferometric arm to the other. When the two transmitted half-power optical signals ½[S(λ1)] propagating through the second portion 109b of the first interferometric arm 109 and respectively through the second portion 110b of the second interferometric arm 110 reach the second optical coupler 108, an additional π/2 phase shift, introduced by this second optical coupler 108, causes them to constructively recombine in the second optical waveguide 106. As a consequence, a full-power optical signal S(λ1) is made available at the second output port 104 of the integrated optical add/drop device 100.

Similarly, when the two exchanged half-power multiplexed optical signals ½[$S_{IN}\{S(\lambda2), \ldots, S(\lambda n)\}$] propagating through the second portion 109b of the first interferometric arm 109 and respectively through the second portion 110b of the second interferometric arm 110 reach the second optical coupler 108, the additional π/2 phase shift, introduced by this second optical coupler 108, causes them to constructively recombine in the first optical waveguide 105. As a consequence, a full-power multiplexed optical signal $S_{IN}\{S(\lambda2), \ldots, S(\lambda n)\}$ is made available at the first output port 103 of the integrated optical add/drop device 100.

Also this second embodiment of the integrated optical add/drop device 100 allows adding a new signal S'(λ1), centred on the same wavelength λ1 as the dropped signal S(λ1), to the full-power multiplexed optical signal $S_{IN}\{S(\lambda2), \ldots, S(\lambda n)\}$, thereby obtaining the multiplexed output optical signal $S_{OUT}\{S'(\lambda1), S(\lambda2), \ldots, S(\lambda n)\}$. If the new signal S'(λ1) is fed to the second input port 102 of the integrated optical add/drop device 100 and propagated through the second optical waveguide 106, when such a new signal S'(λ1) reaches the first optical coupler 107, a half of the optical power is shifted of π/2 and transferred to the first optical waveguide 105 by this first optical coupler 107; as a consequence, two half-power optical signals ½[S'(λ1)], in phase quadrature, propagate through the first portion 109a of the first interferometric arm 109 and respectively through the first portion 110a of the second interferometric arm 110. These two half-power optical signals ½[S'(λ1)] are transmitted on the respective interferometric arms 109, 110 by the optical filter 112. When this two transmitted half-power optical signals ½[S'(λ1)] propagating through the second portion 109b of the first interferometric arm 109 and respectively through the second portion 110b of the second interferometric arm 110 reach the second optical coupler 108, the additional phase of π/2 introduced by this second optical coupler 108, cause them to constructively recombine in the first optical waveguide 105. As a consequence, a full-power optical signal S'(λ1) is made available at the first output port 103 of the integrated optical add/drop device 100. This full-power optical signal S'(λ1), together with the full-power multiplexed optical signal $S_{IN}\{S(\lambda 2), \ldots, S(\lambda n)\}$ forms the multiplexed output optical signal $S_{OUT}\{S'(\lambda 1), S(\lambda 2), \ldots, S(\lambda n)\}$.

With reference to FIG. 10, in an OFF-state of the integrated optical add/drop device 100 the two phase shifters 115, 116 are in an ON-state, corresponding to the introduction of a phase shift of π/2±2πN. In this situation, the half-power multiplexed optical signal ½[$S_{IN}\{S(\lambda 1), S(\lambda 2), \ldots, S(\lambda n)\}$] propagating through the first portion 109a of the first interferometric arm 109 reaches the optical filter 112 maintaining its phase while the half-power multiplexed optical signal ½[$S_{IN}\{S(\lambda 1), S(\lambda 2), \ldots, S(\lambda n)\}$] propagating through the first portion 110a of the second interferometric arm 110 is shifted of λ/2±2πN in its phase by the first phase shifter 115 before reaching the optical filter 112.

Also in this case, the optical filter 112 transmits the two half-power optical signals ½[S(λ1)] centred on the wavelength λ1 on the respective interferometric arms 109, 110 and exchanges the remaining two half-power multiplexed optical signals ½[$S_{IN}\{S(\lambda 2), \ldots, S(\lambda n)\}$] from one interferometric arm to the other.

Then, the transmitted half-power optical signal ½[S(λ1)] and the exchanged half-power multiplexed optical signals ½[$S_{IN}\{S(\lambda 2), \ldots, S(\lambda n)\}$] propagating through the second portion 110b of the second interferometric arm 110 are shifted of π/2±2πN in their phases by the second phase shifter 116. In this situation, when the two transmitted half-power optical signals ½[S(λ1)] propagating through the second portion 109b of the first interferometric arm 109 and respectively through the second portion 110b of the second interferometric arm 110 reach the second optical coupler 108, an additional π/2 phase shift introduced by this second optical coupler 108, causes them to constructively recombine in the first optical waveguide 105. As a consequence, a full-power optical signal S(λ1) is made available at the first output port 103 of the integrated optical add/drop device 100. Similarly, the remaining two exchanged half-power multiplexed optical signals ½[$S_{IN}\{S(\lambda 2), \ldots, S(\lambda n)\}$] constructively recombine in the first optical waveguide 105 when they pass through the second optical coupler 108 thereby causing a full-power multiplexed optical signal $S_{IN}\{S(\lambda 2), \ldots, S(\lambda n)\}$ being available at the first output port 103 of the integrated optical add/drop device 100.

The full-power optical signal S(λ1), together with the full-power multiplexed optical signal $S_{IN}\{S(\lambda 2), \ldots, S(\lambda n)\}$ form again the original multiplexed optical signal $S_{IN}\{S(\lambda 1), S(\lambda 2), \ldots, S(\lambda n)\}$.

Due to the fact that the two transmitted half-power optical signals ½[S(λ1)] and the remaining two exchanged half-power multiplexed optical signals ½[$S_{IN}\{S(\lambda 2), \ldots, S(\lambda n)\}$] destructively recombine in the second optical waveguide 106 when they pass through the second optical coupler 108, no guided optical signals among those input at the input port 101 of the integrated optical add/drop device 100 are made available at the second output port 104 of the integrated optical add/drop device 100.

Also in this case, in the OFF-state of the integrated optical add/drop device 100, when an optical signal S'(λ1) centred on the wavelength λ1 enters in the second input port 102, it is made available at the second output port 104.

It can be appreciated that also in this case, during the OFF-state of the integrated optical add/drop device 100, the optical filter 112 can be easily tuned (using well-known techniques) leaving essentially undisturbed all channels located between the previously tuned set channel and the new tuned set channel.

The integrated optical add/drop device 100 operates substantially in the same way when the two optical shifters 115, 116 are located in the first and in the second portion 109a, 109b of the first interferometric arm 109.

Figure 11:
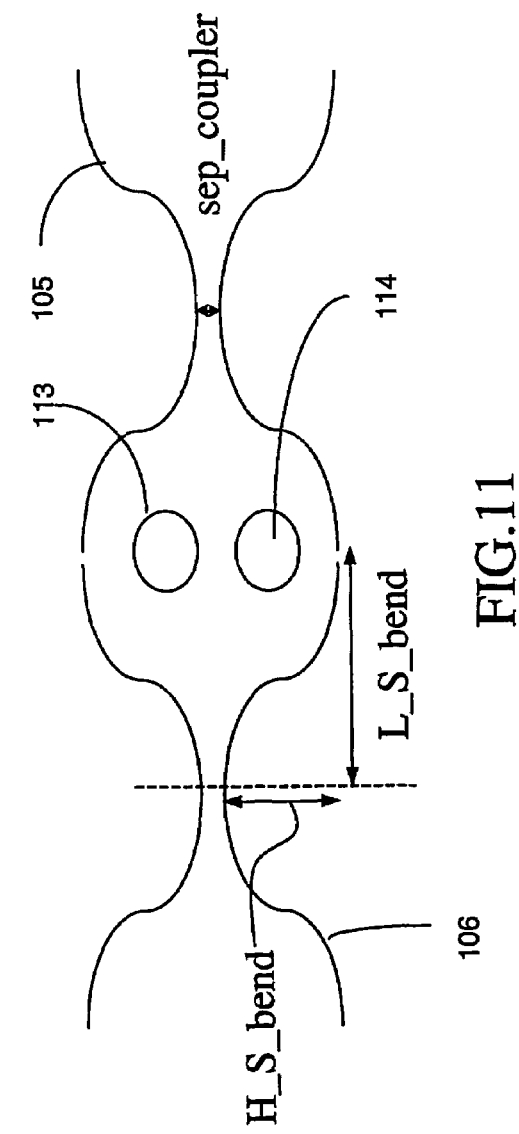
FIG. 11 shows values used in order to simulate the integrated optical add/drop device realized according the present invention.

With reference to FIG. 11, the Applicant has simulated (using a bidimensional FDTD software) the integrated optical add/drop device 100 (realized with the implementation of the optical filter 112 shown in FIG. 3a) using the following values:

$n_{core}$=3, $n_{cladding}$=1, $gap_1$=200 nm, $gap_2$=370 nm, R=1,7 μm, w=200 nm, L_S bend=5 μm, H_S bend=4 μm, sep_coupler=200 nm where:

$n_{core}$ is the refractive index of the core of the first and the second optical waveguide 105, 106 and of the waveguides forming the resonator-cavity loop 113, 114; $n_{cladding}$ is the refractive index of the cladding layers of the first and the second optical waveguide 105, 106 and of the waveguides forming the resonator-cavity loop 113, 114;

$gap_1$ is the interaxial distance between each resonator-cavity loop 113, 114, and its adjacent optical waveguide 105, 106;

$gap_2$ is the interaxial distance between the two resonator-cavity loops 113, 114;

R is the resonator-cavity loop radius;

w is the width of the two optical waveguides 105, 106 and of the waveguides forming the resonator-cavity loop 113, 114;

L_S bend corresponding to half of the length of a bending region of each optical coupler 107, 108;

H_S bend is the height of the bending region of each optical coupler 107, 108;

sep_coupler is the distance between the two optical waveguides 105, 106 in the region of each optical coupler 107, 108.

Figure 12:
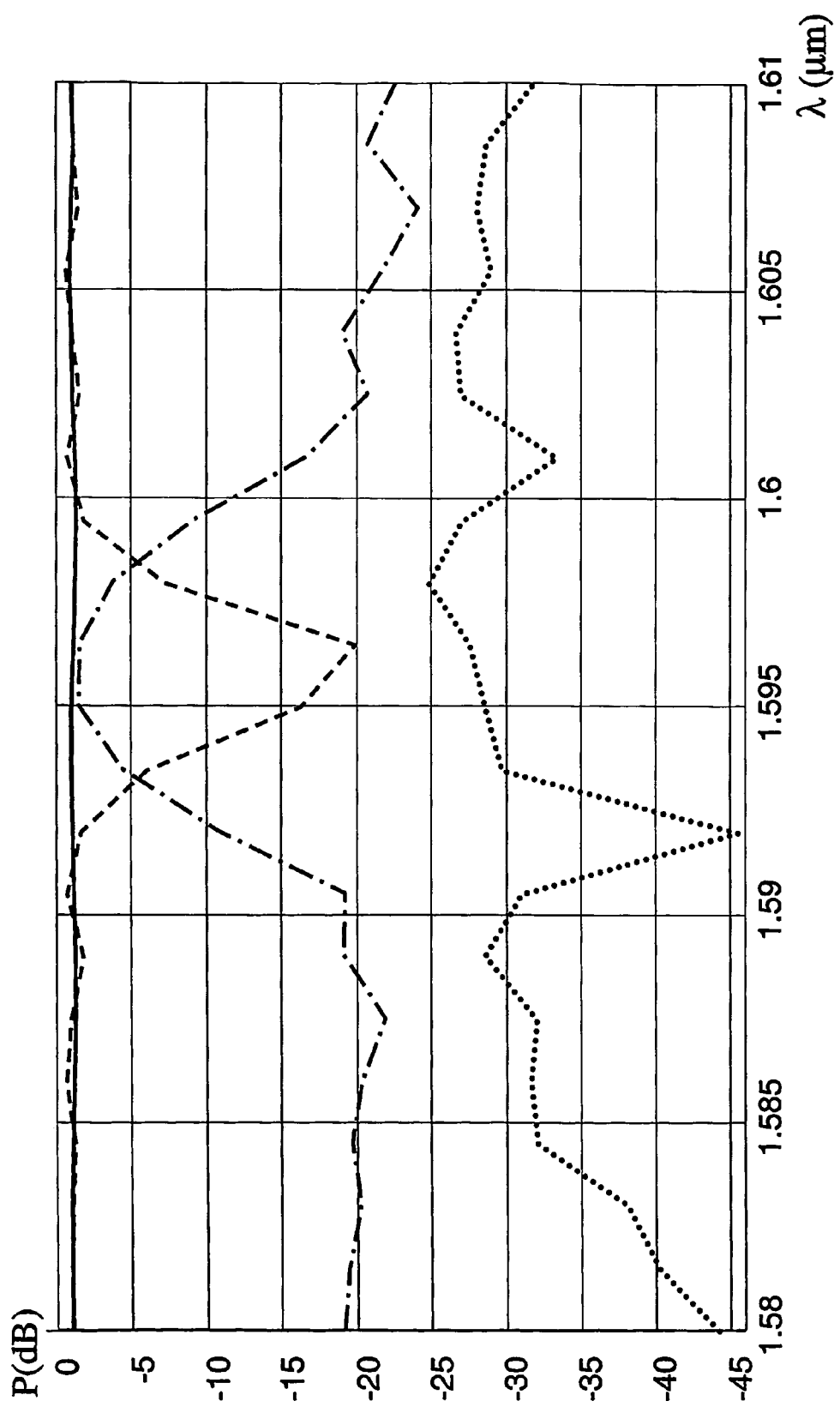
FIG. 12 shows the plot of optical quantities taken on the integrated optical add/drop device of FIG. 11.

FIG. 12 illustrates simulation results of the ON-state operation of the integrated optical add/drop device 100 as simulated.

In detail, the graph of FIG. 12 shows the optical power P (in dB) at the four ports of the integrated optical add/drop device 100 as a function of the wavelength λ (in μm).

In particular, the optical power at the input port is represented by a continuous line; the optical power at the add port is represented by a dotted line; the optical power at the through port is represented by a dashed line; the optical power at the drop port is represented by a dashed-and-dotted line.

It can be noted that the integrated optical add/drop device 100 has been simulated to have a pass band of approximately 4 nm at −3 dB (see the curve representing the optical power at the drop port) while the wavelength λ1 which is dropped is approximately of 1596 nm corresponding to the dropped portion of the curve of the optical power at the through port. Optical power at the add port is only due to excitation of the counterpropagating mode in the resonator-cavity loop.

Figure 13:
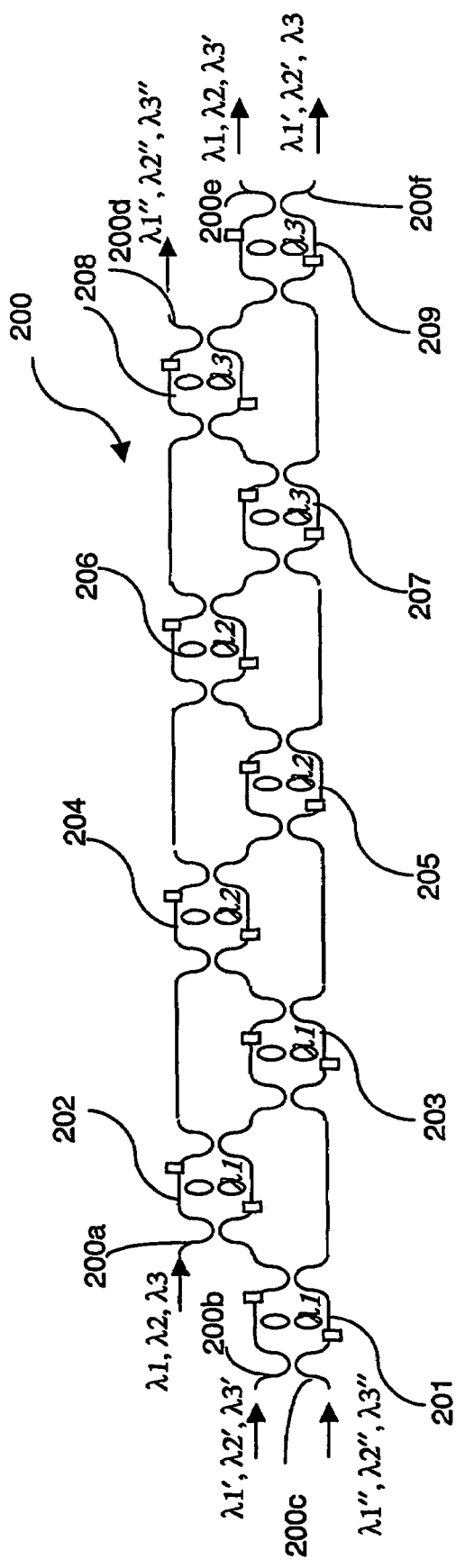
FIG. 13 is a schematic view of an application of the integrated optical add/drop device of FIG. 2b.

FIG. 13 illustrates a schematic representation of an application of the integrated optical add/drop device 100.

In particular, FIG. 13 shows a reconfigurable cross-connect optical device 200 having a first input port 200a for receiving first, second and third optical signals at wavelengths λ1, λ2, λ3; a second input port 200b for receiving first, second and third optical signals at wavelengths λ1', λ2', λ3'; a third input port 200c for receiving first, second and third optical signals at wavelengths λ1", λ2", λ3"; first, second and third output ports 200d, 200e, 200f. The reconfigurable cross-connect optical device 200 comprises a nine cascade-connected integrated optical add/drop devices 201, 202, 203, 204, 205, 206, 207, 208, 209 realized according to the embodiment of FIG. 2b. Each of the integrated optical add/drop devices 201, 202, 203 is tuned on the wavelength λ1; each of the integrated optical add/drop devices 204, 205, 206 is tuned on the wavelength λ2, each of the integrated optical add/drop devices 207, 208, 209 is tuned on the wavelength λ3.

Generally, by suitably configuring the integrated optical add/drop devices 201, 202, 203, 204, 205, 206, 207, 208, 209 it is possible to route the different wavelengths λ1, λ2, λ3, λ1', λ2', λ3', λ1", λ2", λ3" in any desired way onto the output ports 200d, 200e, 200f of the reconfigurable cross-connect optical device 200.

For example, if the integrated optical add/drop devices 201, 202, 204, 205, 207, 208, 209 are in OFF-state and the integrated optical add/drop device 203, 206 are in ON-state, at the first output port 200d of the reconfigurable cross-connect optical device 200 the wavelengths λ1", λ2", λ3" are available; at the second output port 200e of the reconfigurable cross-connect optical device 200 the wavelengths λ1, λ2, λ3' are available; at the third output port 200f of the reconfigurable cross-connect optical device 200 the wavelengths λ1', λ2', λ3" are available.

Figure 14:
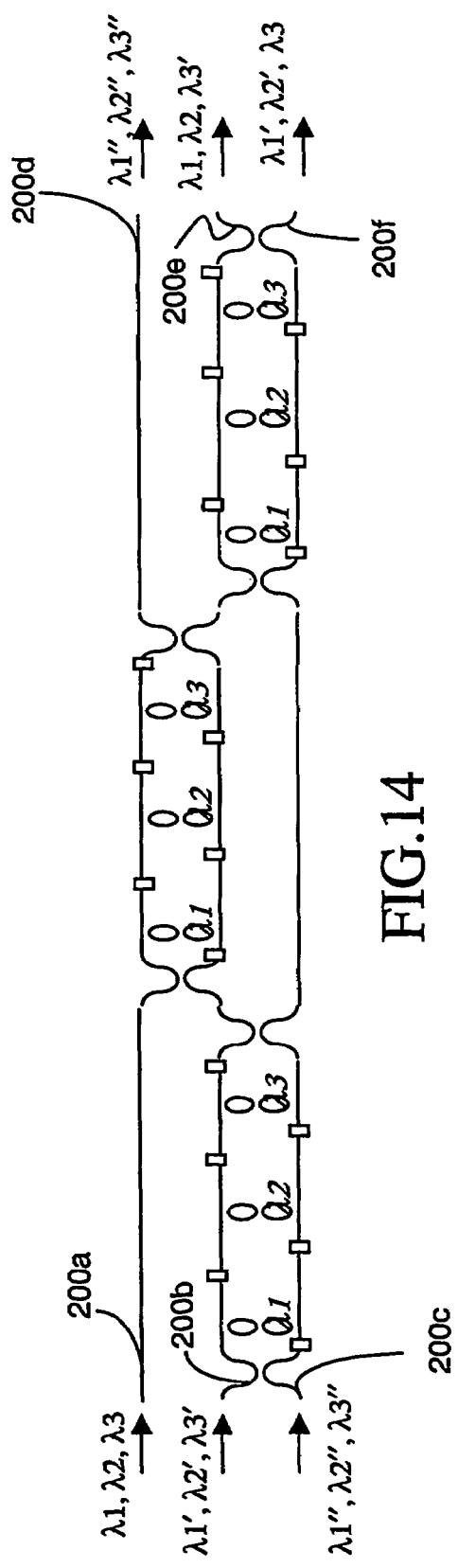
FIG. 14 is a schematic view of a further application of the integrated optical add/drop device of FIG. 2b.

FIG. 14 shows a simplified configuration of the reconfigurable X-connect optical device 200 of FIG. 13.

Some of tThe advantages of the integrated optical add/drop device 100 are the following.

First, the integrated optical add/drop device 100 according to the invention can be realized without using optical circulators. As a consequence it can be integrated in a single chip. Thereby the size of the integrated optical add/drop device 100 can be considerably reduced.

In addition, the integrated optical add/drop device 100, requiring a smaller number of components than the prior art device described previously, has lower manufacturing costs.

Also, it is clear that numerous variations and modifications may be made to the integrated optical add/drop device described and illustrated herein, all falling within the scope of the invention, as defined in the attached claims.

The invention claimed is:

1. An integrated optical add/drop device having switching function for use in wavelength division multiplexing optical communication systems, the add/drop device comprising:
   first and second interferometric arms of an interferometer, the first and second interferometric arms being located between first and second 3-dB optical coupling regions;
   a tunable optical filter having first and second input ports and first and second output ports, said first input port being connected to a first portion of said first interferometric arm, said second input port being connected to a first portion of said second interferometric arm, said first output port being connected to a second portion of said first interferometric arm, said second output port being connected to a second portion of said second interferometric arm, said tunable optical filter being configured for acting as a selective switch exchanger for exchanging between one interferometric arm and the other at least one of a plurality of optical signals S(λ1), S(λ2), . . . , S(λn), received at its input ports and for transmitting the remaining optical signals through its output ports in said first and second interferometric arms; and
   at least first and second variable optical phase shifters located on opposite sides of said optical filter.

2. The device according to claim 1, wherein each of said first and second phase shifter is configured to introduce a phase shift of 0 ±2πN into each optical signal S(λ1), S(λ2), . . . , S(λn), propagating in said first and second interferometric arms when it is in a first state, wherein N is an integer number.

3. The device according to claim 1, wherein each of said first and second phase shifter is configured to introduce a phase shift of π/2±2πN into each optical signal S(λ1), S(λ2), . . . , S(λn), propagating in said first and second interferometric arms when it is in a second state, wherein N is an integer number.

4. The device according to claim 3, the device being configured so that the tunable optical filter is tuned when it is in said second state.

5. The device according to any one of claims 1, 2, or 3, wherein each phase shifter is located in a different interferometric arm.

6. The device according to claim 5, wherein said first phase shifter is located in said first portion of said first interferometric arm and said second phase shifter is located in said second portion of said second interferometric arm.

7. The device according to claim 5, wherein said tunable optical filter is configured for acting as a selective switch exchanger for exchanging between one interferometric arm to the other interferometric arm no more than one of said plurality of optical signals S(λ1), S(λ2), . . . , S(λn).

8. The device according to claim 5, wherein the tunable optical filter comprises an even number of series-coupled resonator-cavity loops accommodated between the first and the second interferometric arm.

9. The device according to claim 5, wherein the tunable optical filter is realized using cascaded optical couplers subdivided by Mach-Zehnder interferometers sections having different respective interferometric arm lengths.

10. The device according to any one of claims 1, 2, or 3, wherein said first and second phase shifters are both located on a same one of said first and second interferometric arms.

11. The device according to claim 10, wherein said first phase shifter is located in said first portion of said same one interferometric arm and said second phase shifter is located In said second portion of said same one interferometric arm.

12. The device according to claim 10, wherein said tunable optical filter is configured for acting as a selective switch exchanger for exchanging between one interferometric arm to the other all but one of said plurality of optical signals S(λ1), S(λ2), . . . , S(λn).

13. The device according to claim 10, wherein the tunable optical filter is realized by means of a symmetric Mach-Zehnder interferometer coupled to a resonator-cavity loop configured to introduce a π phase-shift only at a resonant wavelength.

14. The device according to claim 1, wherein said interferometer is a Mach Zehnder interferometer.

15. The device according to claim 1, wherein said first and second variable optical phase shifters are configured to introduce substantially the same phase shift into each optical signal propagating in and through said first and second interferometric arms.

16. A method for optical tuning, comprising the steps of:

receiving, at an optical add/drop device comprising first and second interferometric arms of an interferometer, a plurality of input optical signals $S(\lambda 1)$, $S(\lambda 2)$, ..., $S(\lambda n)$ centered on respective central wavelengths $\lambda 1$, $\lambda 2$, ..., $\lambda n$;

forming two pluralities of half-power optical signals from said plurality of input optical signals;

sending said two pluralities of half-power optical signals respectively to a first portion of said first interferometric arm and to a first portion of said second interferometric arm;

exchanging between one interferometric arm to the other interferometric arm the two half-power optical signals that are centered on at least one of said plurality of central wavelengths;

transmitting the two half-power optical signals that are centered on the remaining central wavelengths respectively to a second portion of said first interferometric arm and to a second portion of said second interferometric arm, so as to obtain two pluralities of exchanged half-power optical signals respectively on said second portions of said first and second interferometric arms; and introducing a phase shift on at least one of said first portions and at least one of said second portions of said first and second interferometric arms;

recombining the two pluralities of half-power optical signals; and tuning said at least one of said plurality of central wavelengths on which the two exchanged half-power optical signals are centered.

17. The method according to claim 16, wherein the two pluralities of exchanged half-power optical signals are recombined in order to form a full-power plurality of optical signals, said phase shift being selected so that the recombined full-power plurality of optical signals forms the input plurality of optical signals.

18. The method according to claim 17, wherein said phase shift is equal to $\pi/2 \pm 2\pi N$ at each half-power optical signal propagating in said first and second interferometric arms, wherein N is an integer number.

19. The method according to any one of claims 16, 17, or 18, the phase shift being substantially the same for each half-power optical signal propagating in and through said first and second interferometric arms.

* * * * *